(12) United States Patent
Chen

(10) Patent No.: US 7,545,927 B2
(45) Date of Patent: Jun. 9, 2009

(54) EAR-HOOK DISPLAY AND ITS ELECTRICAL DISPLAY APPARATUS

(75) Inventor: Chi-Hung Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 457 days.

(21) Appl. No.: 11/519,931

(22) Filed: Sep. 13, 2006

(65) Prior Publication Data

US 2007/0120974 A1      May 31, 2007

(30) Foreign Application Priority Data

Sep. 15, 2005    (TW) ............................... 94131925 A

(51) Int. Cl.
*H04M 1/00* (2006.01)
(52) U.S. Cl. .................................. 379/447; 455/556.1
(58) Field of Classification Search ................ 379/447, 379/450, 446, 441, 454; 455/90.3, 556.1, 455/556.2, 566, 575.1, 575.6; 381/381; 348/739, 348/744; 351/158; 345/156, 173
See application file for complete search history.

(56) References Cited

U.S. PATENT DOCUMENTS

| | | | | |
|---|---|---|---|---|
| 5,712,658 | A * | 1/1998 | Arita et al. | 345/158 |
| 2002/0094845 | A1* | 7/2002 | Inasaka | 455/566 |
| 2004/0253999 | A1* | 12/2004 | Castaneda, Jr. | 455/575.2 |

* cited by examiner

*Primary Examiner*—Tuan D Nguyen
(74) *Attorney, Agent, or Firm*—Muncy, Geissler, Olds & Lowe, PLLC

(57) ABSTRACT

An ear-hook display is disclosed. It includes a first housing and a second housing connected to the first housing, wherein a first ear-hook apparatus and a second ear-hook apparatus are mounted in the first housing and the second housing respectively. Additionally, a first electrical display apparatus and a second electrical display apparatus are mounted in the first housing and the second housing respectively, wherein the first electrical display apparatus is electrically connected to the second electrical display apparatus. The first electrical display apparatus includes a first half mirror, a first touch pad, a first processor and a first inner projection element. The second electrical display apparatus includes a second half mirror, a second touch pad, a second processor and a second inner projection element.

13 Claims, 5 Drawing Sheets

EAR-HOOK DISPLAY AND ITS ELECTRICAL DISPLAY APPARATUS

RELATED APPLICATIONS

The present application is based on, and claims priority from, Taiwan Application Serial Number 94131925, filed Sep. 15, 2005, the disclosure of which is hereby incorporated by reference herein in its entirety.

FIELD OF THE INVENTION

The present invention relates to an electrical display apparatus, and more particularly, to an electrical display apparatus with a function of a cell phone applied in an ear-hook display.

BACKGROUND OF THE INVENTION

Technology originates from basic human nature, and technological advances seem able to conquer any impossibility. The electrical display, for example, now offers nearly true-to-life resolution, is super-slim, uses energy frugally, and is flexible to many shapes, enabling it to be broadly applied to a diverse spectrum of products. "The blueprint of the electronic display in 2015 predicted by OITDA", issued by the Japanese Optoelectronics Industry and Technology Development Association (OITDA) in March 2000, pointed out that in the twenty-first century, the electronic display would be divided into four species according to usage: wearable display; mobile display; home, office and personal display; and public indoor/outdoor display. The wearable display would be further divided into a head mount display (HMD), an ear-hook display and a wristwatch display. The mobile display is such as a cell phone, a notebook computer, a personal digital assistant (PDA), a calculator, an electronic book, and so on.

The ear-hook display was used solely by the military to supply information to soldiers quickly. However, the ear-hook display has since broadly advanced to entertainment use. Ear-hook displays sold in the public market typically house two liquid crystal displays built with inner projection elements that simulate a larger screen. Additionally, some ear-hook displays further are equipped with super-low bass and stereo systems so that users not only appreciate the visual stimulation but also truer audio, as they would be with a home theater.

Because one advantage of the cell phone is convenient portability, designers now combine various other functions with the cell phone to manage tasks at the office, functions such as address books, appointment calendars, multimedia audio/video, internet access, digital cameras, voice recorders, and so on. Designers, manufacturers and users further wish to develop an electrical display apparatus that combines cell phone and ear-hook display functionality to provide even more convenience and office mobility.

SUMMARY OF THE INVENTION

Accordingly, one aspect of the present invention is to provide an electrical display apparatus applied in an ear-hook display, which possesses functions of a cell phone and an ear-hook display, to satisfy various needs of users.

To achieve the aforementioned aspect, the present invention provides an electrical display apparatus applied in an ear-hook display. The electrical display apparatus includes a half mirror, a touch pad, a processor and an inner projection element, wherein the processor electrically connected to the touch pad is used to supply a first picture data and a second picture data. The inner projection element electrically connected to the processor is used to receive the first picture data or the second picture data optionally. When the inner projection element receives the first picture data, the inner projection element projects a first picture corresponding to the first picture data onto the half mirror. The first picture is shown on the surface of the touch pad via the half mirror so that a user can transmit an operation instruction to the processor by touching the first picture on the touch pad. When the inner projection element receives the second picture data, the inner projection element projects a second picture corresponding to the second picture data onto the half mirror. The second picture is shown on the surface of the touch pad via the half mirror so that the user can see an enlarged second picture on the touch pad.

To achieve the aforementioned aspect, the present invention provides an ear-hook display. The ear-hook display includes casings and screen units disposed in the casings. The casings include a first housing and a second housing connected to the first housing, wherein a first ear-hook apparatus and a second ear-hook apparatus are mounted in the first housing and the second housing respectively. The screen units include a first electrical display apparatus and a second electrical display apparatus. The first electrical display apparatus is mounted in the first housing, wherein the first electrical display apparatus includes a first half mirror, a first touch pad, a first processor and a first inner projection element. The second electrical display apparatus is mounted in the second housing and electrically connected to the first electrical display apparatus, wherein the second electrical display apparatus includes a second half mirror, a second touch pad, a second processor and a second inner projection element. When the screen unit is placed in front of the user's eyes by the first ear-hook apparatus and second ear-hook apparatus, the screen unit can display a simulated image to the user.

According to the embodiment of the present invention, the above-mentioned ear-hook display is a cell phone.

According to the embodiment of the present invention, the above-mentioned first electrical display apparatus and second electrical display apparatus are touch screens.

Accordingly, the aforementioned electrical display apparatus applied in the ear-hook display can possess functions of a cell phone and an ear-hook display, thereby satisfying various needs of users.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

An electrical display apparatus applied in the ear-hook display in the present invention can possess both cell phone and ear-hook display functionality, thereby satisfying various user needs. The ear-hook display and its electrical display apparatus in the present invention are described in detail in conjunction with the accompanying drawings, FIG. 1A to FIG. 2B.

Figure 1A:
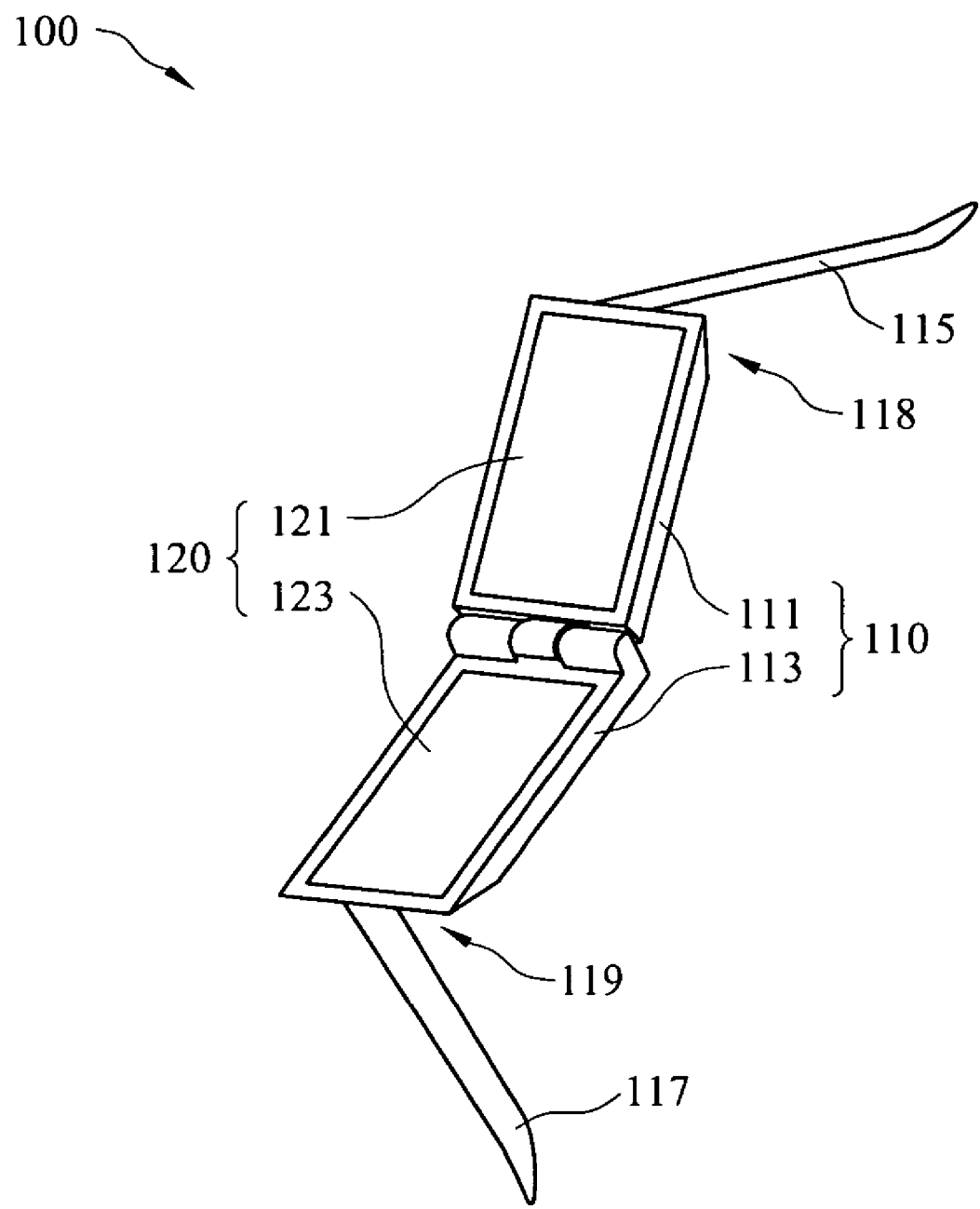
FIGS. 1A-1D are schematic 3-D views showing an ear-hook display according to the present invention.

Reference is made to FIG. 1A, which is a schematic 3-D view showing an ear-hook display of the first preferred embodiment of the present invention. The ear-hook display 100 combines cell phone functionality and includes a casing 110 and a screen unit 120 disposed in the casing 110. The casing 110 includes a housing 111 and a housing 113 connected to the housing 111, wherein electrical display apparatuses 121 and 123 of the screen unit 120 are disposed in the housings 111 and 113 respectively. Ear-hook apparatuses 115 and 117 are disposed on the outsides 118 and 119 of the housings 111 and 113 respectively.

The ear-hook display 100 is placed in front of a user's eyes by the ear-hook apparatuses 115 and 117; and the possible styles of the ear-hook apparatuses 115 and 117 are various and diverse, such as an L-shaped frame and a flexible ring.

Figure 1B:
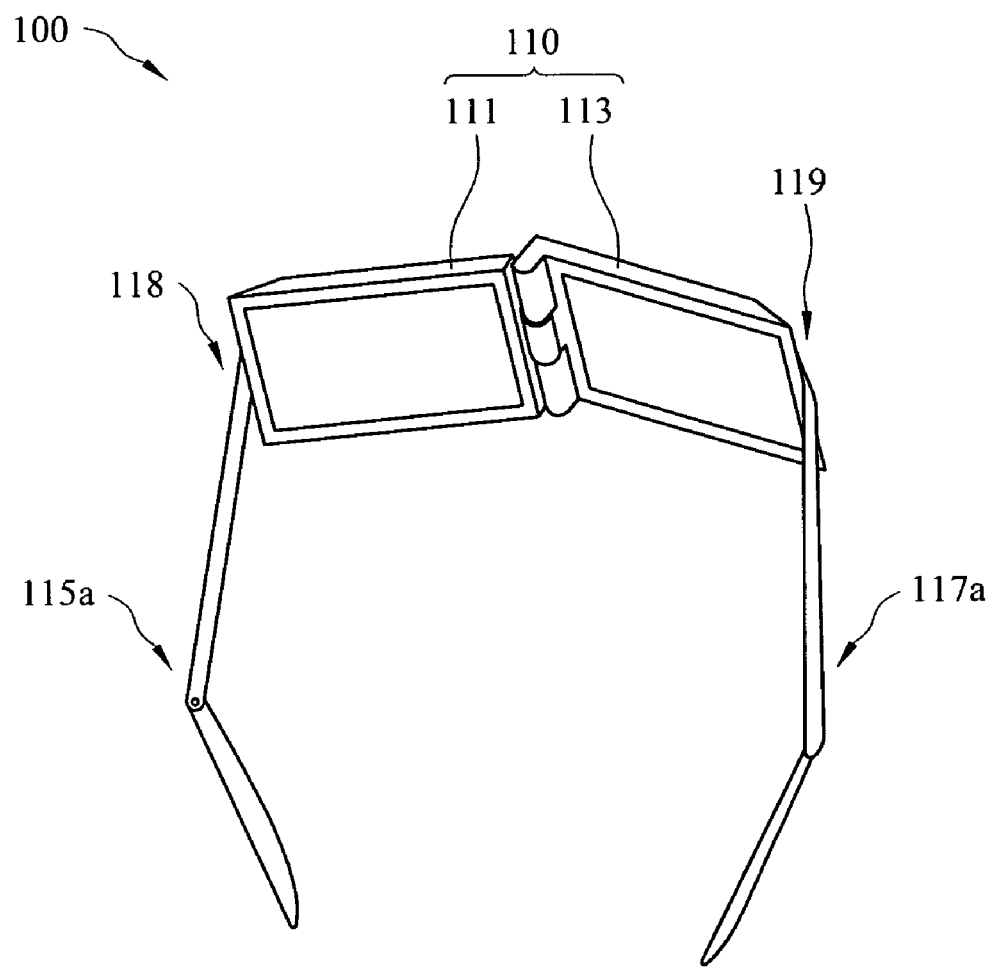

An example of the present invention employing L-shaped frames is shown in FIG. 1B, wherein L-shaped frames 115a and 117a are pivotally connected to the outsides 118 and 119 of the housings 111 and 113 respectively. In practice, the L-shaped frames 115a and 117a can be adjusted in length by bending (as shown in FIG. 1B) or by telescoping (not shown) them in and out.

Figure 1C:
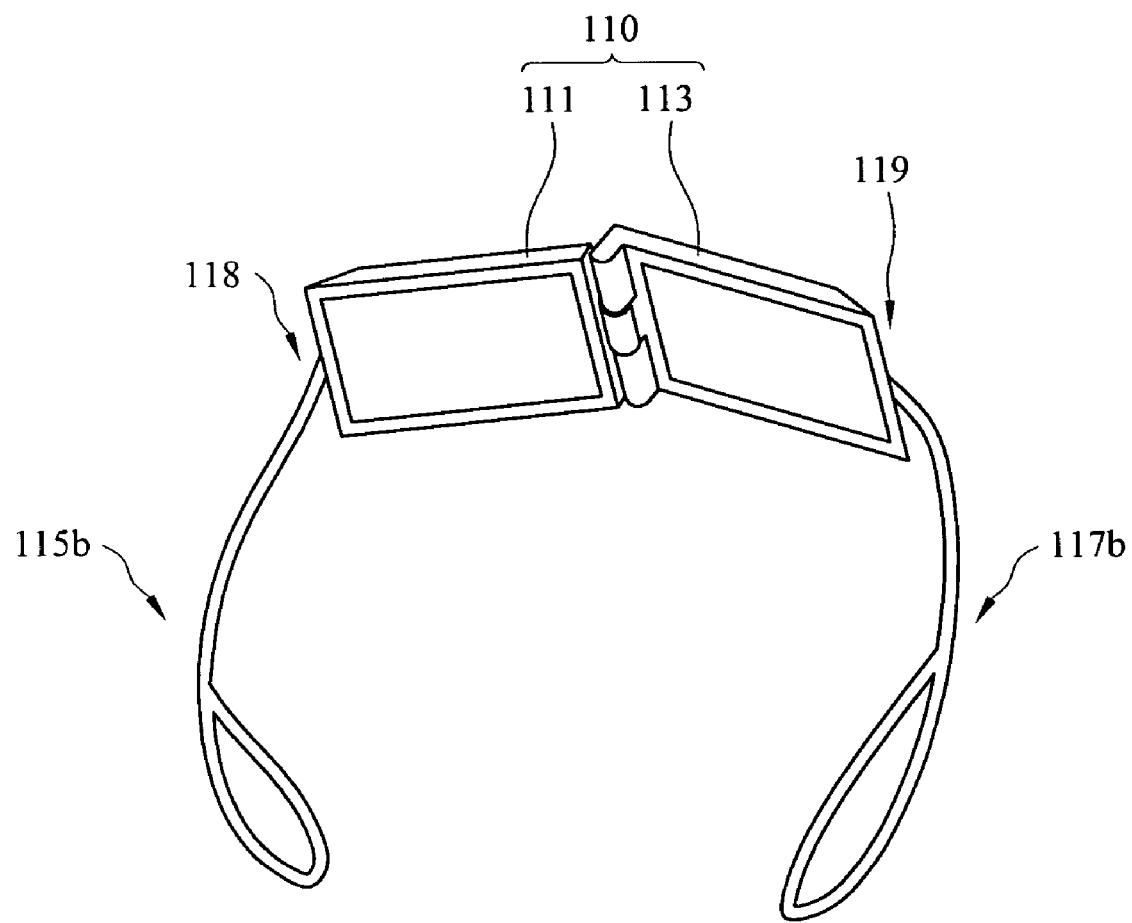

Another example of the present invention is shown in FIG. 1C, which employs flexible rings 115b and 117b as the style of the ear-hook apparatuses 115 and 117. These rings can be fixed or disposed on the outsides 118 and 119 of the housings 111 and 113 respectively.

Figure 1D:
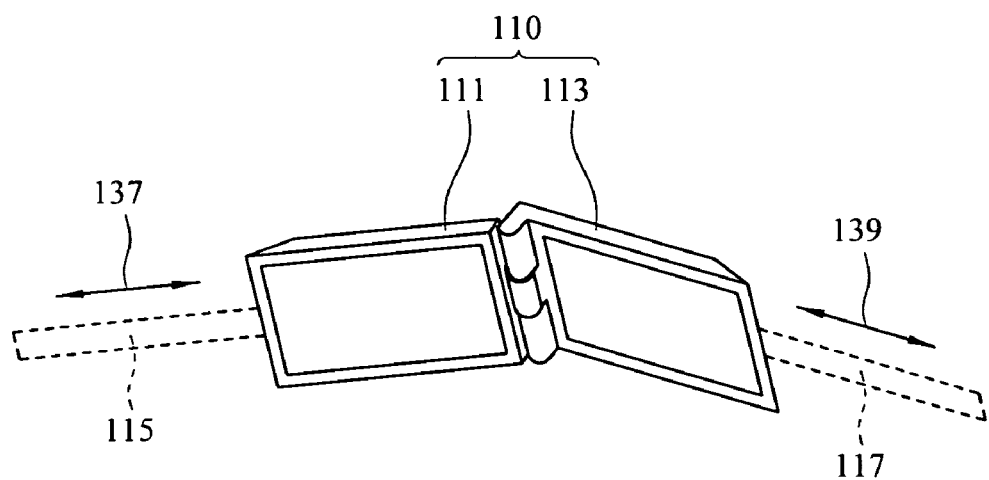

As shown in FIG. 1D, regardless of whether the ear-hook apparatuses 115 and 117 are the L-shaped frames 115a and 117a shown in FIG. 1B or the flexible rings 115b and 117b shown in FIG. 1C, they can be disposed within the housings 111 and 113. Additionally, the ear-hook apparatuses 115 and 117 can be extended out of and retracted into the housings 111 and 113 respectively along the arrows 137 and 139 via openings (not shown) of the housings 111 and 113.

Figure 2A:
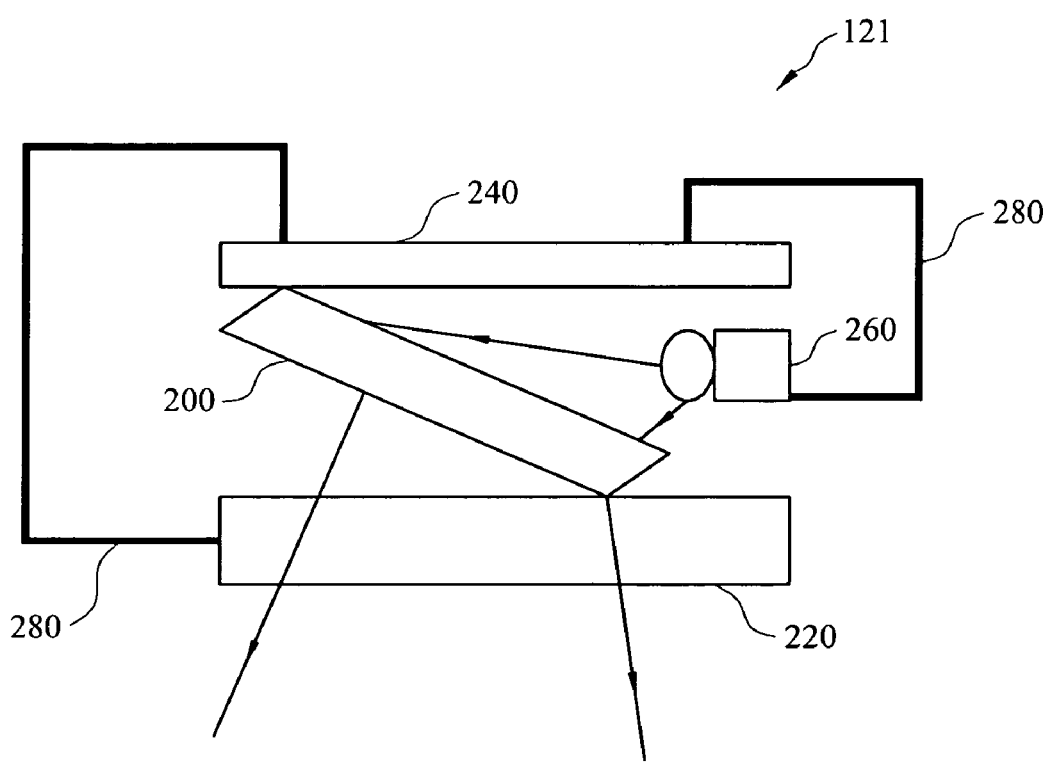
FIG. 2A is a cross-sectional view showing a screen unit of the first preferred embodiment of the present invention.
Figure 2B:
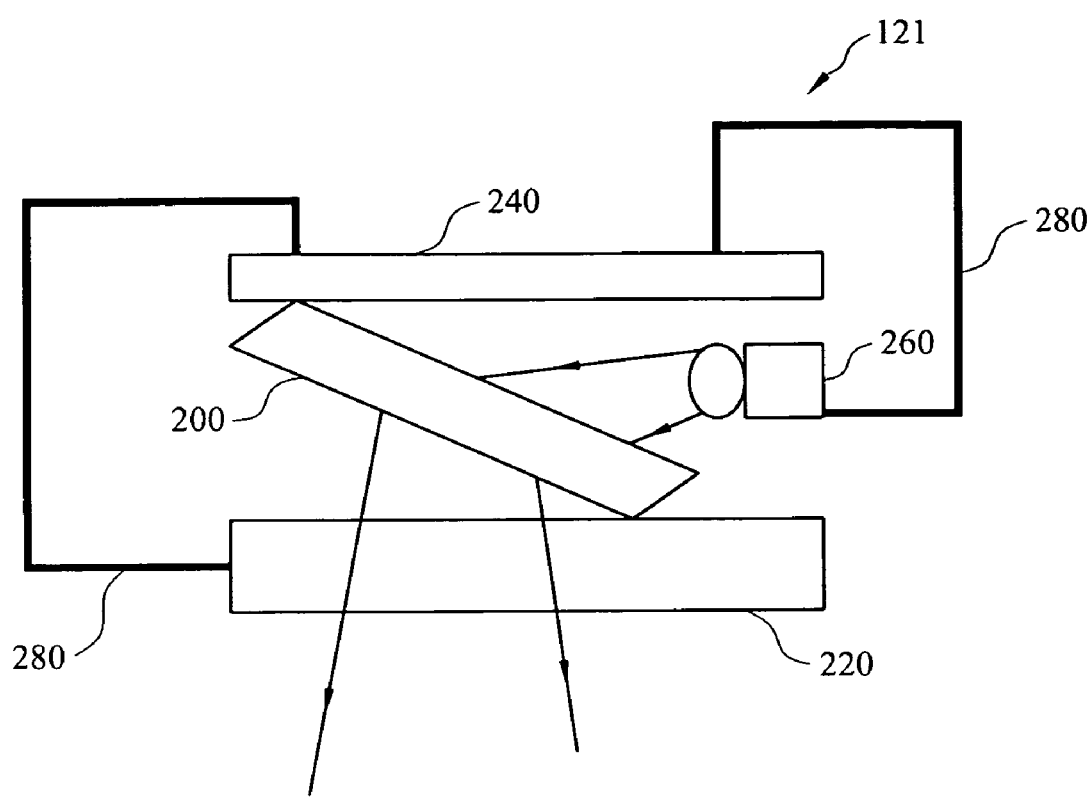
FIG. 2B is a cross-sectional view showing a screen unit of the second preferred embodiment of the present invention.

Reference is made to FIG. 2A and FIG. 2B in company with FIG. 1A, which are schematic cross-sectional views showing a screen unit of the preferred embodiment of the present invention. Referring to FIG. 1A, a screen unit 120 includes the electrical display apparatus 121 and the electrical display apparatus 123 electrically connected to the electrical display apparatus 121, wherein the electrical display apparatuses 121 and 123 are touch screens with inner projection elements preferably. Referring to FIG. 2A, the electrical display apparatus 121 is disposed in the housing 111, wherein the electrical display apparatus 121 includes a half mirror 200, a touch pad 220, a processor 240 and an inner projection element 260. The processor 240 electrically connected to the touch pad 220 with electric wires 280 is used to supply a first picture data and a second picture data. The inner projection element 260 electrically connected to the processor 240 with electric wires 280 is used to optionally receive the first picture data or the second picture data. When the inner projection element 260 receives the first picture data, it will project a first picture corresponding to the first picture data onto the half mirror 200, and the first picture is shown on the touch pad 220 via the half mirror 200.

Next, the user can transmit an operation instruction to the processor 240 by touching the first picture on the touch pad 220. At this time the cell phone is in the state of normal use, the inner projection element 260 can project a larger range to show the screen picture of the cell phone, wherein the screen picture includes a plurality of icons, and the user can directly touch the icons to operate the cell phone.

FIG. 2B is a schematic cross-sectional view showing the electrical display apparatus 121 while displaying a picture for entertainment. When the inner projection element 260 receives the second picture data, it will project a second picture corresponding to the second picture data onto the half mirror 200, and the second picture is shown on the touch pad 220 via the half mirror 200. Then, the user can see an enlarged second picture by approaching the touch pad 220. At this time, the inner projection element 260 projects a smaller range to show a picture for entertainment, and the user can wear the cell phone like spectacles to view an enlarged image.

The electrical display apparatus 123 is disposed in the housing 113, is electrically connected to the electrical display apparatus 121, and has the same elements and functions as the electrical display apparatus 121. Therefore, its details are not reiterated here.

The ear-hook display of the present invention can possess both cell phone and ear-hook display functionality, thereby satisfying various needs of users. The screen unit of the present invention is characterized with functions of a display screen and a touch screen. When the ear-hook display is operated in practice, such as by using it as a cell phone, the electrical display apparatus 121 of the screen unit 120 can serve as a display screen of a cell phone, and the electrical display apparatus 123 can serve as a touch screen for showing symbols, as shown in FIG. 1A. Accordingly, the user can input symbols to use the various functions of the cell phone via the electrical display apparatus 123.

On the other hand, when the invention is employed as an ear-hook display, the screen unit 120 is placed in front of the user's eyes by the ear-hook apparatuses 115 and 117. The inner projection elements in the electrical display apparatuses 121 and 123 of the screen unit 120 can project a simulated image to the user (not shown), such as a fixed or motion picture, as shown in FIG. 1B to FIG. 1D.

Furthermore, the ear-hook display 100 of the present invention can optionally be equipped with super-low bass and stereo system (not shown) so that the user can not only appreciate the simulated image but also appreciate fine audio similar to a home theater system. Those skilled in the prior art can realize that the installation of the super-low bass and stereo system can be achieved as with conventional ear-hook displays, so details thereof are not described here.

Accordingly, the advantage of the ear-hook display of the present invention is to possess cell phone and ear-hook display functionality, thereby satisfying various needs of users.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An ear-hook display, said ear-hook display comprising:
   a first ear-hook apparatus;
   a second ear-hook apparatus; and
   a screen unit disposed between said first ear-hook apparatus and said second ear-hook apparatus, wherein said screen unit comprises:
   a first electrical display apparatus, comprising a first half mirror, a first touch pad, a first processor and a first inner projection element; and
   a second electrical display apparatus electrically connected to said first electrical display apparatus, wherein said second electrical display apparatus comprises a second half mirror, a second touch pad, a second processor and a second inner projection element;

wherein when said screen unit is placed in front of user's eyes via said first ear-hook apparatus and said second ear-hook apparatus, said screen unit displays an image to the user.

2. The ear-hook display of claim 1, further comprising:

a casing comprising a first housing and a second housing connected to said first housing, wherein said first ear-hook apparatus and said second ear-hook apparatus are disposed in the said first housing and said second housing respectively.

3. The ear-hook display of claim 1, wherein said ear-hook display is a cell phone.

4. The ear-hook display of claim 1, wherein said first electrical display apparatus is a touch screen.

5. The ear-hook display of claim 1, wherein said second electrical display apparatus is a touch screen.

6. The ear-hook display of claim 2, wherein said first ear-hook apparatus and said second ear-hook apparatus are disposed in a first outside of said first housing and a second outside of said second housing respectively.

7. The ear-hook display of claim 2, wherein said first ear-hook apparatus and said second ear-hook apparatus are disposed in said first housing and said second housing respectively and can extend out of or retract into said first housing and said second housing.

8. An electrical display apparatus applied in an ear-hook display, said electrical display apparatus comprising:

a half mirror;

a touch pad;

a processor electrically connected to said touch pad to supply a first picture data and a second picture data; and an inner projection element electrically connected to said processor to receive said first picture data or said second picture data optionally;

wherein:

when said inner projection element receives said first picture data, said inner projection element projects a first picture corresponding to said first picture data on said half mirror and said first picture is shown on said touch pad via said half mirror so that a user can transmit an operation instruction to said processor by touching said first picture on said touch pad; or when said inner projection element receives said second picture data, said inner projection element projects a second picture corresponding to said second picture data on said half mirror and said second picture is shown on said touch pad via said half mirror so that said user can see an enlarged second picture by approaching said touch pad.

9. The electrical display apparatus of claim 8, further comprising:

a casing, covering said half mirror, said processor and said inner projection element.

10. The electrical display apparatus of claim 9, further comprising:

an ear-hook apparatus disposed at said casing.

11. The electrical display apparatus of claim 8, wherein said electrical display apparatus is a cell phone.

12. The electrical display apparatus of claim 10, wherein said ear-hook apparatus is disposed on an outside of said casing.

13. The electrical display apparatus of claim 10, wherein said ear-hook apparatus is disposed within said casing and can be extended out of or retracted into said casing.

* * * * *